340-870.13 SR

OR 4,035,771

[redacted]

United States [Patent] [19]

Büsing et al.

4,035,771

[45] July 12, 1977

[54] PROCESS FOR THE REMOTE TRANSMISSION AND INDICATION OF ELECTRICAL MEASURED VALUES IN ELECTROLYSIS CELLS

[75] Inventors: Walter Büsing, Bergisch Gladbach; Hans Richert; Martin Weist, both of Leverkusen; Eberhard Zirngiebl, Cologne, all of Germany

[73] Assignee: Bayer Aktiengesellschaft, Leverkusen, Germany

[21] Appl. No.: 441,592

[22] Filed: Feb. 11, 1974

[30] Foreign Application Priority Data

Feb. 27, 1973 Germany .......................... 2309611

[51] Int. Cl.² .................... G01N 27/42; H04Q 9/00

[52] U.S. Cl. .............................. 340/151; 324/30 R

[58] Field of Search .......... 340/150, 151, 177, 183; 324/30 R, 30 B, 29

[56] References Cited

U.S. PATENT DOCUMENTS

| | | | |
|---|---|---|---|
| 3,059,228 | 10/1962 | Beck et al. | 340/147 CN |
| 3,384,874 | 5/1968 | Morley et al. | 340/151 |
| 3,387,266 | 6/1968 | Swartwout et al. | 340/150 |
| 3,518,628 | 6/1970 | Giel et al. | 340/150 |
| 3,539,928 | 11/1970 | Gardner et al. | 340/147 CN |
| 3,541,513 | 11/1970 | Paterson | 340/151 |
| 3,696,019 | 10/1972 | Arrington et al. | 324/29 X |
| 3,750,155 | 7/1973 | Oman | 340/183 |
| 3,751,355 | 8/1973 | Mandroian | 324/30 R X |
| 3,757,205 | 9/1973 | Dauphinee | 324/30 R |
| 3,764,983 | 10/1973 | Stok | 340/150 |
| 3,796,993 | 3/1974 | Fox et al. | 340/151 |
| 3,805,242 | 4/1974 | Matsumoto et al. | 340/151 |
| 3,895,351 | 7/1975 | Neuner et al. | 340/151 |

*Primary Examiner*—Donald J. Yusko

*Attorney, Agent, or Firm*—Burgess, Dinklage & Sprung

[57] ABSTRACT

A process for the remote transmission and indication of measured values of a plurality of electrolysis cells, comprising sequentially interrogating the measured values in the electrolysis cells by means of an electronic pulse counter and an electronic check-point reversing switch connected to the pulse counter, transmitting the measured values in the form of an analogue signal to a separate monitoring facility common to said cells, and controlling the electronic pulse counter at the electrolysis cell from the monitoring facility by switching pulses or a pulse series, a maximum of four signal wires being provided between each electrolysis cell and the monitoring facility irrespective of the number and type of check points.

19 Claims, 12 Drawing Figures

PROCESS FOR THE REMOTE TRANSMISSION AND INDICATION OF ELECTRICAL MEASURED VALUES IN ELECTROLYSIS CELLS

This invention relates to a process for transmitting the current load of the anodes or anode groups of electrolysis cells, the voltage between anodes and cathode (cell voltage) and other measured variables, such as temperature, flow volume, substance composition, etc., on the time-division multiplex principle, from the electrolysis cells on which the particular measured values are determined, to a separate monitoring facility (observation or control room), and for transmitting or otherwise utilizing the measured values in this monitoring facility.

Industrial electrolysis installations, for example for the production of chlorine and sodium hydroxide from an aqueous rock salt solution, generally comprise a relatively large number of electrolysis cells, which are series-connected in a d.c. circuit in such a way that the anodes of one cell are connected through busbars (of copper or aluminum) to the base of the adjacent cell, the base acting as the cathode. The first cell in a circuit is connected on its anode side, while the last cell of the circuit is connected on its cathode side to the rectifier installation required for the supply of current.

Depending upon the number of electrolysis cells connected together in a circuit and the position of each individual cell in the circuit, these cells have a more or less high voltage with respect to ground. The electrolysis circuit of a relatively large chlorine factory is mentioned as an example: with an average voltage of 4.5 volts and 180 cells in the circuit, the overall voltage amounts to 180 . 4.5 volts = 810 volts.

The liquids (for example rock salt solution or sodium hydroxide) flowing into and out of the cells represent current bridges to the ground potential. Depending upon the pipe network, therefore, this produces a distribution of potential in the electrolysis circuit which can be more or less asymmetrical to the ground potential and voltages to ground of 500 V or more can be formed in the adversely situated cells. It is clear that this involves a considerable risk of accident and necessitates appropriate accident-prevention precautions. In particular, all the components and lines for the transmission of test and control signals between the electrolysis cells and a central control room have to be designed in such a way that voltage delays in the control room are avoided.

In the operation of rock salt electrolysis plants which use the amalgam process, i.e. they work with a layer of mercury acting as cathode covering the bottom of the cell, recent experience has shown that it can be of economic advantage to continuously monitor, for irregularities, not only the working voltage of an electrolysis cell, but also the distribution of current among the anodes along the cell. In cells with metallic anodes, it is even regarded as essential, because of the sensitivity of these anodes to excessive current loads, to install devices for automatically monitoring the distribution of current. In the past, it has been preferred to monitor the anodes collectively rather than individually in accordance with their association with the feeder bars.

If the ratio between the current absorption of one anode group and the average current absorption of all anode groups exceeds one or more staggered upper limits, a warning signal, for example, is initially released in these metal-anode cells. Thereafter, the affected anode group, or even the entire cell cover with all the anodes, is lifted, for example by means of a servomotor and a suitable mechanical gear system, until overloading has been eliminated.

German Offenlegungsschrift 2,211,851 proposes to continuously monitor each individual anode of an electrolysis cell for the intensity of the direct current supplied. A single-anode monitoring system of this kind undoubtedly affords even more reliable protection against overloading-induced damage to the anodes than the collective monitoring system. Its major advantage, however, is that it greatly simplifies correction of the distance of the individual anodes from the mercury cathode, which has to be carried out manually at certain time intervals.

When the system automatically signals or otherwise indicates which of the anodes in which cell are in need of correction, these anodes can be specifically adjusted, i.e. in the order of urgency. There is then no need for the time-consuming checking of all the anodes of one cell by means of portable ammeters.

Since, for many years now, technical development has resulted in increasingly larger cell units capable of withstanding higher specific loads, it is likely that, in the future, the determination of even more measured physical variables in the cells and the transmission thereof to the control room will become important.

It is advantageous to transmit measured data from the various check points of an electrolysis cell sequentially through only a few connecting lines, rather than simultaneously through a number of parallel signal lines. For this purpose, conventional processes employ checkpoint interrogating systems which, in addition to a pair of lines for sequentially transmitting the measured values to the control room, require at least *n* signal wires for controlling the check-point switches for $2^n$ check points installed near the electrolysis cell from the control room.

To prevent accidents, it is advisable to keep all the systems, which are installed near the electrolysis cell for determining and transmitting the measured data, at the electrical potential of the cell and, in this way, to avoid dangerous potential differences in the vicinity of the cell. Potential separation and fusing the signal lines against voltage leaks into the control room is best carried out at a point which is separated in space both from the cells and also from the control room, and which is protected against adverse environmental effects. It is clear that the outlay involved in potential separation and line fusing increases with the number of signal wires required.

The present invention relates to a process for the remote transmission and indication of measured values of electrolysis cells, in which the measured values are sequentially interrogated in the electrolysis cells by means of an electronic pulse counter and an electronic multiplexer connected to this pulse counter. The measured values are transmitted in the form of an analogue signal to a separate monitoring facility common to several cells. The electronic pulse counter at the electrolysis cell is controlled from the monitoring facility by switching pulses or pulse series, a maximum of four signal wires being required between each electrolysis cell and the monitoring facility irrespective of the number and type of check points.

The measured-value transmission system according to the invention affords the following advantages:

Through only one pair of lines, it is possible to transmit analog d.c. current signals in one direction and control pulses for addressing the multiplexer in the opposite direction with a very high degree of safety against transmission errors.

Since the measured-value signals accumulate solely or preferably in analog form at the cell, it is particularly simple to convert them into a direct current signal.

By virtue of the analog direct current signal, the accuracy with which the measured values are transmitted can be influenced very easily by varying the transmission time, a sampling rate, per check point. For example, it is possible to interrogate 100 check points on one cell in extremely rapid sequence and to monitor them for rough deviations which could signify immediate danger. If required, however, a longer transmission time could be allocated to individual check points in an interrogation cycle of this kind where greater accuracy of transmission is permanently or periodically required in their case.

Field-effect transistors or bipolar transistors are used as the multiplexer switches. Semiconductors can be used for this purpose because the measured-value signals are confined to or can be connected to the cell potential, owing to the measuring technique applied. Accordingly, voltage differences which are unacceptably high for semiconductor switches do not occur or can be avoided by simple means. Furthermore, there is no need to use electromechanical relays or other components which are sensitive to strong magnetic fields in the vicinity of the electrolysis cells.

The invention will be further described with reference to the accompanying drawings wherein.

Figure 1:
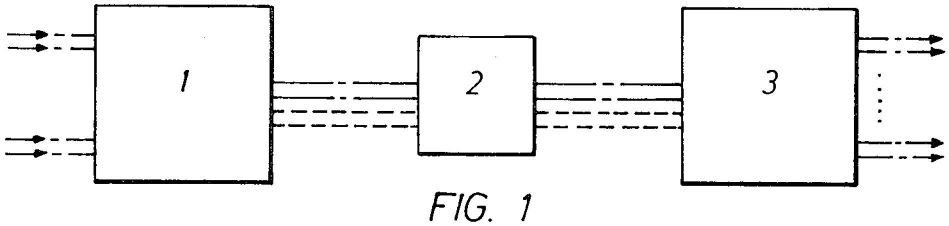
FIG. 1 is a schematic overall view of a system for carrying out the process of the invention.

The application of the process according to the invention is illustrated in FIG. 1, in which the reference 1 denotes a device for interrogating the check points on the electrolysis cell, the reference 2 denotes a device for separating the potential between the electrolysis cell and the control room and the reference 3 denotes a device for distributing the measured values to associated indicating or evaluating systems. As shown in FIG. 1, the parts 1 and 2, and the parts 2 and 3, respectively, are connected together by two or, at most, four signal wires.

In the most simple case (FIG. 2), part 1 corresponds to a multiplexer 4, such as the multiplexer shown in U.S. Pat. No. 3,796,993 consisting of controllable semiconductors, such as the AM3705/AM3705C analog multiplexer available from the National Semiconductor Corporation, and which connects one of the two-terminal measuring inputs 5 to the measuring output 6. An electronic counter 7 is provided, which counts control pulses delivered to the input 8, but which is set back to zero by a control pulse delivered to the input 9. The counting position of the counter is transmitted in coded form, for example in binary code, through the lines 10 to the control inputs of the multiplexer. With binary coding, *n* control lines are required for $2^{n-1}$ to $2^n$ check points.

A pulse-routing unit 11 is used to identify the various switching pulses for repeating and resetting the counter which arrive on the pair of control wires 12 from the control room, and to distribute them among the lines 8 and 9. For example, a switching pulse having a short duration can be used for incrementing the counter and a longer switching impulse for resetting the counter. In this case, the pulse-routing unit 11 contains at least one timing stage and further logical switching elements, by means of which the counter 7 is reset through the line 9 when a switching pulse lasts for longer than the period of the timing stage.

In order to inactivate any short interference pulses that may possible occur in the line 12, it is advisable to equip the pulse-routing unit 11 with a second timing stage, the preset period of which is shorter than the length of the repeat switching pulses, but is longer than that of the interference pulses. In this case, the pulse-routing unit is designed in such a way that both the timing stages are switched on in response to the leading edge of the incoming switching pulse. The switching pulse is only switched through to the line 8 at the end of the short delay time and increments the counter 7 and (through the lines 10) multiplexer 4 to advance to the next check point of the electrolytic cell. At the end of a relatively long delay time, a switching pulse is switched to the line 9 to reset the counter, as already described.

The output 6 of the multiplexing unit 4 is connected to the input of a voltage-current converter 13. In the voltage-current converter, the measured-value signal, for example in the form of a d.c. voltage of a few millivolts where the anode current is measured by the shunt method, is amplified in a conventional manner and converted into a direct current linearly associated with the measured-value signal. The direct-current signal is transmitted through a pair of wires 14 and section 2 (for potential separation) to the section 3 in the control room.

It can be seen from the foregoing description of section 1 that the check points connected to the measuring inputs 5 of the multiplexer 4 can be interrogated in cyclic sequence by arranging for the counter 7 to be stepped by brief switching pulses, for example 10 milliseconds in duration, following one another at intervals of, for example, 100 milliseconds, in the section 3 of the control room to that counting position associated with the last check point connected to the multiplexer 4. The counter 7 may then be reset by a long (for example 100 milliseconds) switching pulse to the counting stage zero which is associated with the first check point.

Figure 3:
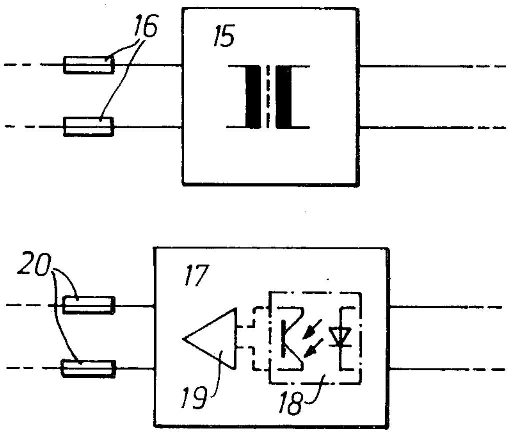
FIG. 3 is a schematic view of the electrical circuitry of a portion of the system of FIG. 1.

As shown in FIG. 3, section 2 comprises a conventional d.c. separating transformer 15 for potential separation, adequately voltage-resistant fuses 16 for fusing the measuring line, and an isolation circuit element 17 (only symbolized in FIG. 3) for potential separation of the control impluse line, which element contains a conventional optoelectronic coupler 18 with a switching amplifier 19 connected thereto, and the components of which are protected by fuses 20 against the dangerous effects of defective insulation.

The optoelectronic coupler comprises a light-emitting diode as light source, a photoconductor as voltage-resistant insulation means and a phototransistor as a light receiver. In contrast to an electromechanical relay, this combination of components is suitable for transmitting binary signals without wear and substantially without delay.

Figure 2:
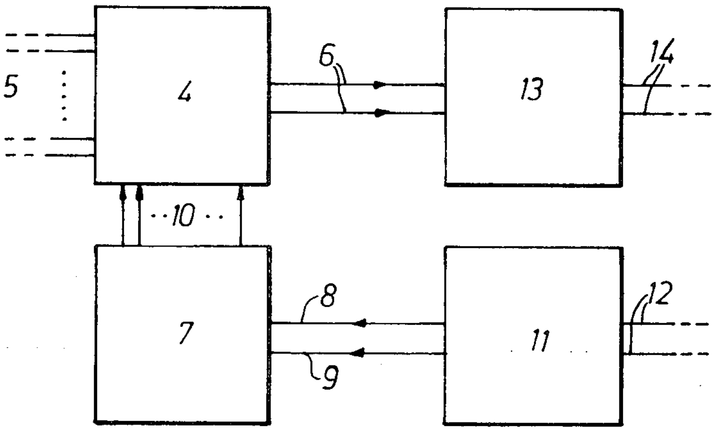
FIG. 2 is a schematic view of a system in somewhat more detail than FIG. 1.
Figure 4:
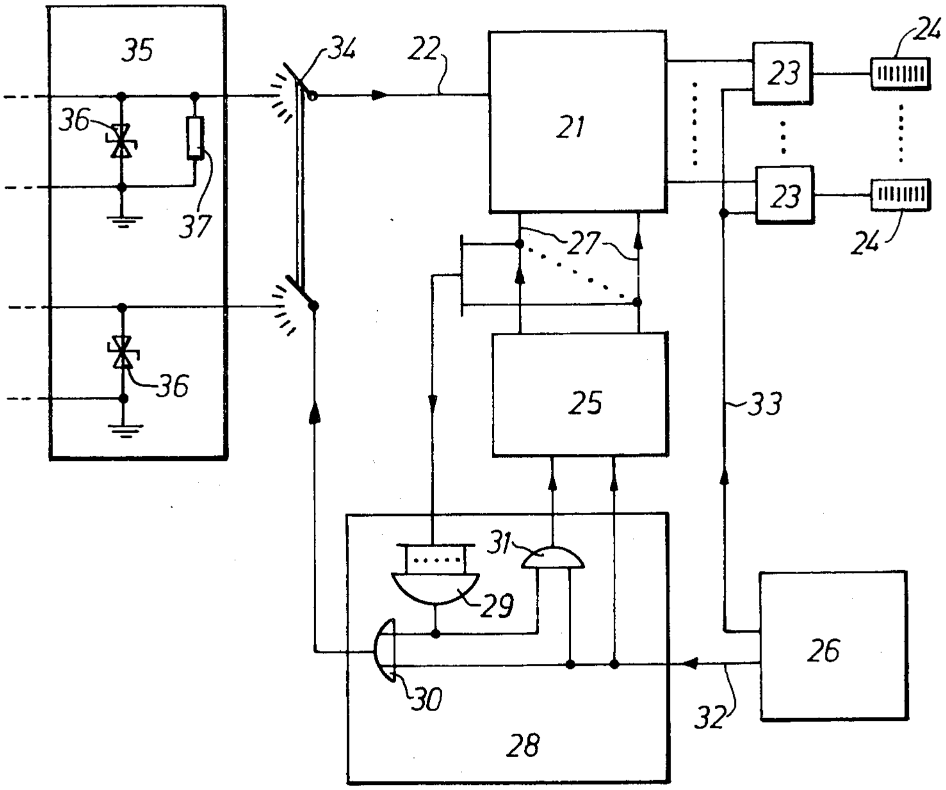
FIG. 4 is a schematic view of the electrical circuitry of another portion of the system of FIG. 1, located in the control room.

Distribution device 3 of FIG. 1, as shown in FIG. 4 is preferably mounted in the control room and, in the particularly simple embodiment described here, contains a measured-value distributor 21 which sequentially distributes the measuring voltage 22 at its input to measured-value stores 23. Each of the measured value stores 23 is connected to an indicating instrument 24. A measured-data store together with an indicating instrument is permanently associated with each check point on the electrolysis cell. The measured-value distributor 21 can be made in the same way as the multiplexer 4 in section 1 (FIG. 2). The only difference is that the measured-value signal passes through the measured-value distributor in the opposite direction. Since the pair of conductors, which transmit the measured-value signal from section 2 to section 3 in the control room, is connected to one end to a fixed reference potential (voltage 0 V, preferably grounded) at the input of section 3, it is also sufficient for the measured-value distributor 21 to have only one input terminal in contrast to the multiplexer 4.

The measured-value distributor 21 is controlled in synchronization with the cross-point switching network 4. For this purpose, section 3 contains an electronic pulse counter 25 which is stepped from counting stage to counting stage by pulse generator 26 through pulses of, for example, 10 milliseconds duration, following one another at 100 milliseconds intervals. The particular counting position is transmitted through the lines 27 to the measured-value distributor 21 in the form of a control signal (for example in binary code). This arrangement corresponds in its mode of operation to the arrangement of the multiplexer 4 and counter 7 (FIG. 2) in section 1. In particular, an equal number of control lines 27 is also required for the same coding.

In this example, the counter 7 in section 1 is synchronized with the counter 25 in section 3 for each counting cycle by means of the circuit element 28 in the following way:

In the counters 7 and 25, *a* counting stages having the same ordinal number of from zero to *a*–1, are associated with a number of check points *a*. The counter 25 has an additional counting stage having the ordinal number *a*. Now, the control lines 27 between the counter 25 and the measured-value distributor 21 are additionally connected to the inputs of the decoding gate 29 in such a way that this gate is only open during the counting stage with the ordinal number *a*. The gate 29, which is in the form of a logical AND-configuration, has its output connected to one input of an OR gate 30 and an AND gate 31. In both gates 30 and 31 remaining, the input is connected to a switching pulse output 32 of the pulse generator 26.

With this circuit arrangement, the short switching pulse of the pulse generator 26 is transmitted unchanged, through the OR gate 30 and the switching pulse line, to the counter 7 in section 1 in all those counting stages having an ordinal number of from zero to *a*–1. However, when the counter 25 has reached the counting stage *a*, a long switching pulse corresponding in duration to the pulse interval (for example 100 milliseconds) is transmitted to section 1 through the decoding gate 29 and the OR gate 30. The counter 7 is then set to zero through the pulse-routing unit 11 and the line 9 and remains there. This condition holds, even when the next switching pulse from the pulse generator 26 resets the counter 25 to zero through the AND gate 31.

If the synchronization of both counters is lost through failure of the supply voltage or for other reasons, it is safely restored at the beginning of the second interrogation cycle by virtue of the foregoing described circuit arrangement.

To ensure that the measured-value stores 23 are able to take over the new measured value shortly before the end of an interrogation step, i.e. at a point in time at which the transients in the measured-value signal emanating from the multiplexer 4 have adequately abated and no longer interfere by any appreciable extent with the accuracy of transmission, the stores are equipped with a gate circuit. This gate circuit is controlled by the pulse generator 26 through the line 33 with an additional measured-value transfer pulse staggered in time in relation to the multiplexer pulse. In this arrangement, the measured-value signal connection between the measured-value distributor 21 and each measured-value store 23 is only briefly established, for example for 10 milliseconds, during the term of the measured-value transfer pulse.

There is only one section 3 in an electrolysis installation comprising several electrolysis cells. In the example described, a double multiple throw selecting switch 34, which can be operated by hand, is provided for switching to the sections 1 and 2 associated with the individual cells. If it is desired to use sections 1 to 3 for automatically monitoring the electrolysis cells, for example to ensure that no limits are exceeded, the cell selecting switch 34 can be equipped with an electromechanical drive or can be electronic without any moving components and can be further switched, for example, by the reset impulse at the output of the decoding gate 29. In this case, section 3 is connected to each cell for the duration of an interrogation cycle.

The connecting circuit 35, connecting potential separating device 2 to the distribution device 3, contains overvoltage limiters 36 for the measuring line and for the switching pulse line (for protection against overvoltages beyond the range of the cells), and a resistance 37 across which a d.c. voltage signal proportional to the direct current signal is developed. One connecting circuit 35 is required for each device connected to an electrolysis cell.

In the example described, the measured values are stored and indicated in analog form. Another possible method of operating the section is for each measured value to be converted into a digital value during the interrogation step by means of an analog-digital converter and then to be stored and indicated or further processed in digital form. In this case, the control lines 27 (FIG. 4) are used for addressing the measured-value stores.

Finally, in order to clearly display the measured-values of identical check points independently of the particular state of loading of the electrolysis installation, and more particularly to display the distribution of current to the individual anodes or even to the anode groups of an electrolysis cell, it is advisable to indicate the quotient of the particular measured value and an average value from all the identical check points interrogated on one cell, which can be interpreted as an ideal value, rather than to indicate the absolute measured values. In this case, the indicating range is selected in such a way that the indicating mark is situated in the middle of the scale when the true value coincides with the ideal value. In this way, deviations from the ideal value are particularly easy to detect.

In the case of anode current measurement, the average value can be derived from the measured value for the total electrolysis current available in any electrolysis installation. In addition, it is possible, for example in the first of two interrogation cycles per cell, initially to add the values of the individual check points, and subsequently to divide the sum by the number of check points and hence to calculate the average value. This average value is then used in the subsequent interrogation cycle for measured value/average value quotient formation. Computing operations of this kind can be carried out both with analog and with digital signal processing. It is best to use a process computer, especially in installations comprising a relatively large number of cells.

Figure 5:
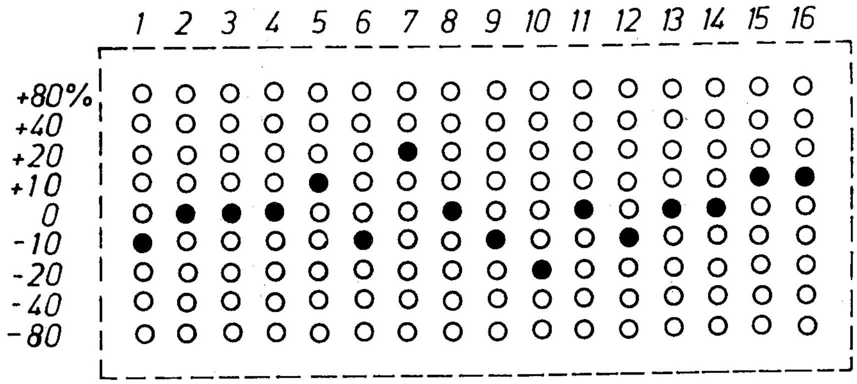
FIG. 5 is a plan view of an instrument panel in the control room for simultaneously reading a plurality of measured values.

One particularly simple and space-saving possiblity of simultaneously displaying a number of identical measured values, for example the current consumption of the individual anodes of an electrolysis cell, in an easy-to-read form, is to use a number of light emitting diodes which, as shown in FIG. 5, are arranged in horizontal and vertical rows on an insulating plate of suitable size and which have connecting wires soldered to the conductor tracks present on the plate. Each light-emitting diode column is associated with a check point and each light-emitting diode line with a measured value or, preferably, with the quotient of measured value and average value or with the percentage deviation in the measured value from the average value.

In cases where the light-emitting diodes are controlled by means of suitable digital stores in such a way that only one diode characterizing the particular measured value is illuminated per column, it is possible to obtain an extremely clear picture, for example of the distribution of current along the electrolysis cell.

As shown in FIG. 5, association of the percentage deviation can be progressive. In this way, it is possible to use the reading as an aid for accurately adjusting the anodes and, on the other hand, even to detect relatively large deviations as such. The light-emitting diodes assumed to be illuminated are shown in black in FIG. 5.

The light-emitting-diode indicating system has the advantage of being unaffected by magnetic fields. In fairly old rock-salt electrolysis installations in particular, part of the control room is situated above the high current bars between the rectifier installation and the cell room. In this case, the magnetic field strength in the control room is so great that it affects a number of analog indicating instruments. In particular, data and curve recorders with cathode ray tubes cannot be used on account of the deflection of the cathode ray in the magnetic field.

Figure 6:
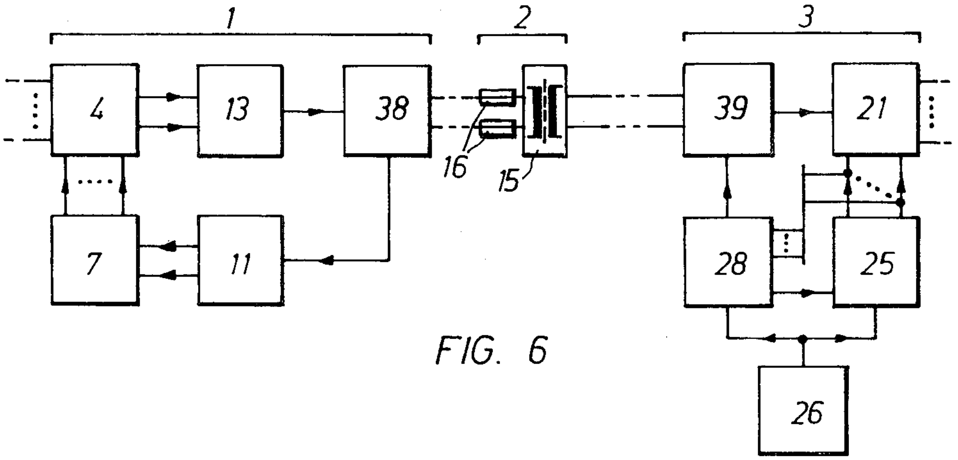
FIG. 6 is a schematic view of an alternative structure to that of FIG. 2.

In another modification of the process according to the invention, only one pair of wires is used for transmitting the analog measured-value signal and the pulse signal for switching the multiplexer to different check points. In this case, section 2 consists solely of the direct-current separating transformer 15 and the fuses 16 (FIG. 6). By comparison with the possibility described with reference to FIGS. 2 and 4, sections 1 and 3 additionally contain a signal-routing unit 38 and a signal-routing unit 39.

The function of these signal-routing units and their cooperation with the adjacent circuit components is described in the following with reference to FIG. 7. To understand the mode of operation, it is important to take into consideration the supply voltages for the individual control circuits of sections 1 and 3. If standard integrated control circuits of the MOS-type are used for the multiplexer 4 (FIG. 2) and the measured-value distributor 21 (FIG. 4), two supply voltages of +5 V and −15 V are required. The other circuit components are preferably designed in such a way that they also function with these voltages or one of them.

Figure 7:
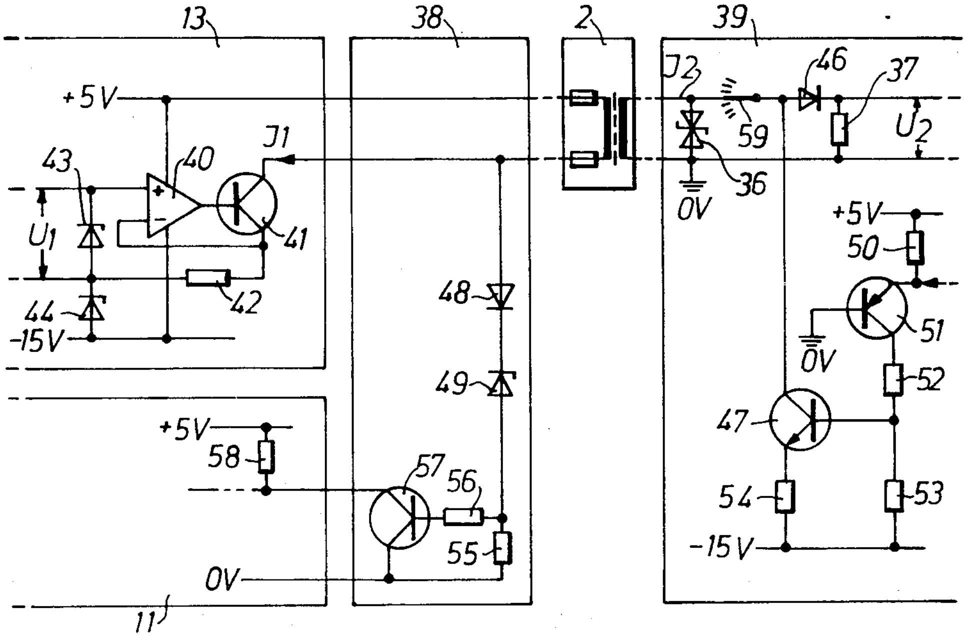
FIG. 7 is a wiring diagram of a portion of the system of FIG. 6.

In the example shown in FIG. 7, the circuit element 13, for example (for measured-value amplification and for generating the direct-current measured-value signal), is supplied from the +5 V terminal and from the −15 V terminal, i.e. with a 20 V d.c. voltage. The pulse routing unit 11 equipped with integrated digital control circuits requires the +5 V and 0 V terminals and processes the signal level commonly encountered in TTL-technology. As a passive control circuit, the signal-routing unit 38 does not require any auxiliary energy, while the signal-routing unit 39 in section 3 (for feeding the switching impulse into the two-terminal transmission line) is connected to all three voltage terminals (+5 V, 0 V, −15 V).

Figure 8:
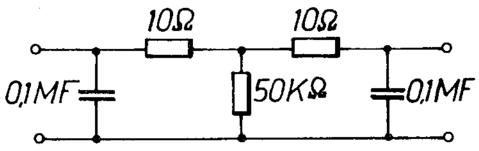
FIG. 8 is a wiring diagram of a component for use in conjunction with FIG. 7.

Another factor which has to be taken into consideration is that the d.c. transformer 15 in section 2 has to function symmetrically and transmit d.c. voltages and direct currents of both polarities. It is possible, for example, to use a standard embodiment, the transmission behavior of which for direct current and low-frequency alternating current is approximately characterized by the equivalent circuit diagram shown in FIG. 8. (The function of potential separation is not shown in FIG. 8). According to the invention, the output signal from the circuit element 13 (FIG. 7) is a direct current, the intensity of which is linearly associated with the input measuring voltage and, in addition, is independent within wide limits of the voltage drops along the transmission line, and of voltage drops or fed-in countervoltages in section 3. The magnitude of this direct current has an upper limit which, for the signal range of from 0 to 20 mA or from 4 to 20 mA, preferably amounts to between about 22 and 25 mA.

One known circuit arrangement (illustrated in FIG. 7) for producing a direct current of this kind comprises an operational amplifier 40, an npn-transistor 41, a feed back resistance 42, a Zener diode 43 for limiting modulation and a Zener diode 44 for establishing a suitable working point for the inputs of the operation amplifier 40. The correlation between the input voltage U 1 of this circuit arrangement and the output current J 1 is essentially determined by the value of the feed back resistance 42.

The output direct current J 1 flows from the connection of the +5 V supply voltage through the transmission line to the section 2 and from there back to the transistor 41 through a wire 45 and the signal-routing unit 38. The voltage of the wire 45 in relation to the supply voltage is governed by the resistance of the lines and of the fuses 16 but preferably by the voltage drop in the direct-current separating transformer 15. According to FIG. 8, there is not a great deal of difference in this voltage drop at the input and output of the separating transformer, owing to the low series resistance. However, this voltage drop, and hence the voltage of the wire 45, towards the +5 V connection of the supply voltage can be influenced either by allowing the input direct current J 2 to flow through the diode 46 switched into the transmission direction and the resistance 37 or by diverting it to the switching transistor 47 in the signal-routing unit 39 in section 3.

In the first case, a positive voltage drop is produced, and the voltage of the wire 45 in section 1 is clearly negative with respect to the +5 V level of the supply voltage. Since, under these conditions, no current is able to flow through the diode 48 and the Zener diode 49, which is designed for example with a 5V breakdown voltage, in the part 38 of section 1, the direct current J 2 arriving in section 3 only differs from the direct current J 1 in section 1 by the small fraction which flows off in the 50 k Ω shunt resistor of the direct-current separating transformer (see FIG. 8) and the influence thereof upon the accuracy of the transmission can be ignored so far as application of the system is concerned.

During the operational state described, the measured value is thus transmitted in the form of a direct-current signal to section 3 where it appears as a d.c. voltage U2 at the resistance 37 (FIG. 7) and is delivered to the measured-value distributor 21 in the form already described (see also FIG. 4) or otherwise further processed. The transistor 47 in the part 39 is blocked during this operational state.

The change from the operational state "measured-value transmission" to the operational state "switching pulse transmission" is completed by bringing the transistor 47 from its blocking state into its conductive state. This produces a positive switching pulse which is guided from 28 of section 3 to the resistance 50 and the emitter of the pnp-transistor 51. The transistor 51 becomes conductive and, because of the flow of current across the resistances 52 and 53, allows a positive voltage in relation to the emitter of the transistor 47 to be formed at its base. The current J 2 then no longer flows through the diode 46 and the resistance 37, but instead to the collector of the transistor 47.

By means of a resistance 54 preceding the emitter of the transistor 47, the switching current J 2 flowing through the collector of this transistor is adjusted, for example to 40 mA. Irrespective of the momentary intensity of the measuring current J 1, limited to a maximum of 25 mA, which is fed from section 1 into the transmission line, the measurable, positive voltage drop hitherto prevailing at the input of the circuit element 39 (for example at the overvoltage limiter 36) now becomes negative, and the voltage of the wire 41 in section 1 becomes positive in relation to the +5 V level of the supply voltage.

A current, the intensity of which corresponds to the difference between the switching current J 2 and the measuring current J 1, thus flows through the now conductive series connection of diode 48 and Zener diode 49. This current is distributed between a leakage resistance 55 and the current path, which consists of a current-limiting resistance 56 and the base-emitter section of a transistor 57. The transistor 57 transmits the switching pulse to the input of the pulse-routing unit 11 where it is brought by means of a resistance 58 to the signal level of TTL-technology.

It is pointed out that the described embodiment of the signal-routing units 38 (in section 1) and 39 (in section 3) represents only one of several possiblities of embodying the principle behind the invention. In particular, it is possible to use different and differently dimensioned electronic components for this purpose.

During the switching pulse, the voltage across the resistance 37 in the part 39 of section 3 is zero because the diode 46 blocks the flow of current. Accordingly, the measured value (voltage U2) has to be taken over into a store (for indication or other processing) before the beginning of each switching impulse.

If section 3 is intended to be switchable to several electrolysis cells equipped with this instrument, it is possible, for example, to arrange a single pole selector switch 59 in that part 39 of the circuit between the over-voltage limiter 36 required for each cell connection and the line branching to the diode 46 and transistor 47.

In all the possibilities hitherto described for the remote transmission of measured data from electrolysis cells, it has been assumed that cyclic interrogation of the check points connected to the transmission system is sufficient for operational requirements. However, it may be desirable in certain applications to interrogate individual check points or all the check points at random, rather than sequentially, from section 3 in the control room. A transmission system which incorporates this random selection possibility can also be used for transmitting to the cell switching commands differing from those used for switching from one check point to another or for returning the check point counter to its zero position. Examples of switching commands such as these include switching commands for anode-adjusting motors or for switching off the cell by means of a shunting switch installed in the electrolysis cell.

Applications such as these are possible if a series of pulses, instead of an individual (short or long) switching pulse, is transmitted from section 3 to section 1 on the cell for identifying the required check point or the required switching function. For this purpose, the address of the check point or switch function in binary code is converted in a known manner by means of a parallel-series transducer or shift register in section 3 into a definite sequence of selectively spaced pulses transmitted as such to section 1 by means of the circuit arrangement already described and converted back into their original form in section 1 by means of a series-parallel transducer.

Figure 9:
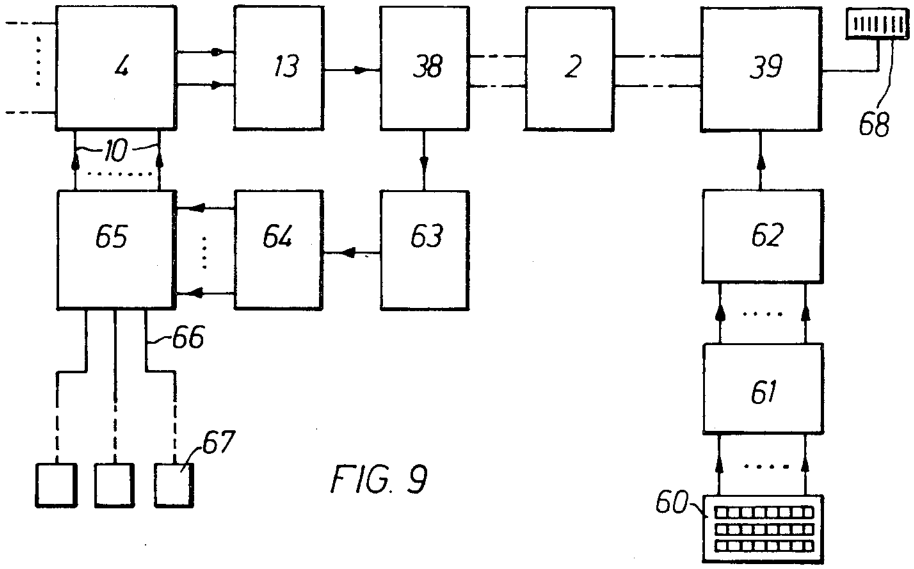
FIG. 9 is a schematic overall view of another system for carrying out the novel process, alternative to FIG. 2.

One simple example is explained in the following with reference to FIG. 9. The required check point is addressed for the required switching command issued by means of a keyboard 60, i.e. by operating one or more keys. The address associated with the check point or switching command is then formed as a combination of binary signals in a coding circuit 61 connected to the keyboard. This combination of binary signals is delivered in the form of a serially transmitted pulse address message from a parallel-series transducer or shift register 62, through the components 39, 2 and 38 already described, to a series-parallel transducer or shift register 63, and is placed in an address store 64 after reconversion into the parallel form. The address is identified in an address decoding circuit 65 and, providing it is a check-point address, is delivered through the control lines 10 to the multiplexer 4. A command address is delivered through one of the control lines 66 to a selected power contactor 67 in the form of a regulating signal. The measured value of a check point selected from the keyboard 60 is indicated as already described through the multiplexer 4, the measuring amplifier and the voltage-current converter 13, the signal-routing unit 38, the transmission line with its potential-separating point 2 and the signal-routing unit 39, only one indicator 68 being provided in this particularly simple example for all the check points which can be located from the keyboard.

Finally, it is also possible to combine the sequential interrogation of measured values controlled by brief switching pulses with the specific selection of certain check points or regulating functions through series of pulses.

Figure 10:
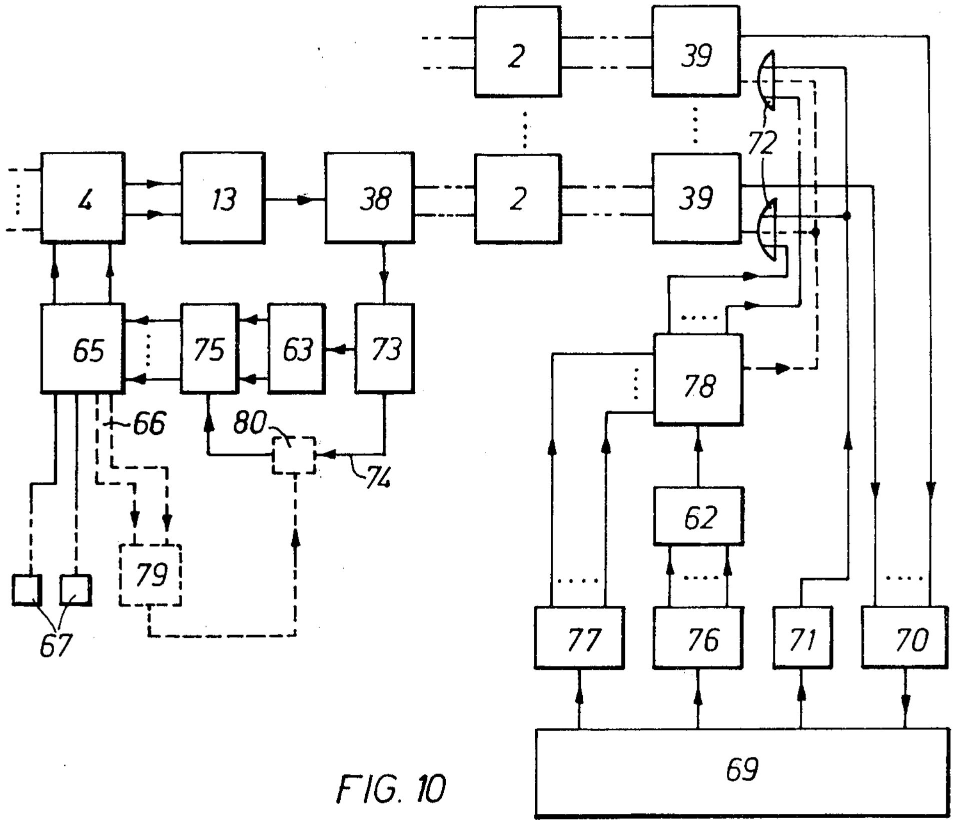
FIG. 10 is a schematic overall view of another system including automatic self-monitoring provision.
Figure 12:
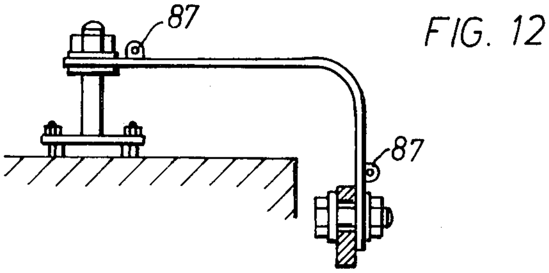
FIG. 12 is a lateral elevation of a portion of the structure of FIG. 11.

One such possibility is shown in FIG. 10. In this case, the central section is linked to a process computer 69. A signal-routing unit 39 of the kind described hereinabove is associated with each electrolysis cell, its analog-value output being linked to one of the analog-value inputs 70 of the process computer. For sequentially interrogating the check points, the brief switching pulses described hereinabove are simultaneously transmitted to all the electrolysis cells through OR-gates 72 and the signal-routing units 39 by means of a digital output 71 of the process computer.

Section 1 comprises an impulse-routing unit 73 which identifies the brief switching pulses as such and brings them through the line 34 to the counting input of a presettable counter 75. The particular counting position corresponds to the check point address and is further processed in the manner described above.

In this example, the selective interrogation of check points or switching functions can be carried out separately for each cell in turn to the common further switching during cyclic interrogation. The parallel-series transducer 62 is supplied with the check point or switching-function address through the digital outputs 76 of the process computer, while the cell address, through the digital outputs 77, controls an pulse series distributor 78 in such a way that the serially transmitted pulse address message is delivered from the transducer 62 through the distributor 78 to the OR-gate 72 for the required cell.

The pulse address message passes through the sections 39, 2 and 38 to the pulse-routing unit 73, where it is recognized as such and delivered through the series-parallel transducer 63 to the preset inputs of the counter 75.

Allowance has to be made in the working program of the process computer for the fact that the counter 75 of the separately selected cell has to be resynchronized through a second pulse telegram with the counter 75 of the other cells before cyclic interrogation recommences. Synchronization of all the counters 75 is simplified if, by means of a special address, pulse address message can be passed, from the distributor 78, through the collecting line indicated in FIG. 10 by broken line to a third input of the OR-gates 72 of all the cells.

If a given cell is not involved in the interrogation cycle, it is possible to provide a one-digit binary store 79 and a gate circuit 80 in section 1, as shown in broken lines in FIG. 10. The store 79 is either set or erased through the lines 66 by means of two switching-function addresses and, in the following gate circuit 80, the line 74 is switched through or separated up for the further switching impulses. In sophisticated measuring installations of the kind described in the foregoing, maintenance is another factor, in addition to installation, which should involve as little expense as possible.

Since the probability of an error occurring becomes greater as the size of the system to be installed increase, it is best as far as possible to incorporate a self-monitoring facility in the system. For this purpose, likely sources of error should be examined and automatic or remote-controlled test systems provided, according to the probability factor and the probable consequences of an error (failure of the installation, error-location and error-elimination costs, etc.), and furthermore according to the extra expense involved.

FIG. 10 shows particularly favorable prerequisities for an automatic self-monitoring system. If the inputs of multiplexer 4 are not all connected to operational check points, but instead one or two inputs, for example with the highest binary address, are connected to calibration voltage sources which are either available in the form of standard components or can readily be produced by means of Zener diodes, the process computer, by interrogating the calibration voltages, is able both to test the entire measured-value transmission path from the circuit element 13 for amplification and other errors and to detect faulty synchronization of the counter 75, in the case of cyclic measured-value interrogation. The effect of each of the aforementioned errors is such that the voltage appearing at the analog input 70 of the process computer deviates from the expected value which is adjusted at the calibration voltage source. The correspondingly programmed process computer 69 is able, for example after a deviation such as this has occurred, to locate the particular check point previously reached in the normal interrogation cycle by sending out the address in the form of a pulse address message and, after another voltage check, to decide whether there was an error in synchronization. A message sent out in this way can considerably simplify location of the fault by the maintenance engineer.

In the case of individual-anode monitoring by sequentially checking the current absorption of each anode by shunt measurement, two connecting lines per check point normally have to be installed between the check point and the multiplexer in order to detect the voltage drops in the anode current-supply bands. In order, despite the numerous line connections, to be able to remove the cell cover without difficulty from the bottom of the cell and to take it away for repair purposes (replacement of anodes, etc.), it is necessary either to fix section 1 to the cover and to connect it to the signal transmission line and the supply voltage, for example through a four-terminal plug connection, or, if this is not possible for design reasons, to design the connecting lines between the anodes and the multiplexer in section 1 in such a way that they can be releasably connected, for example by means of one-terminal plug connections, to the terminals on the current-supply bands of the anodes.

Figure 11:
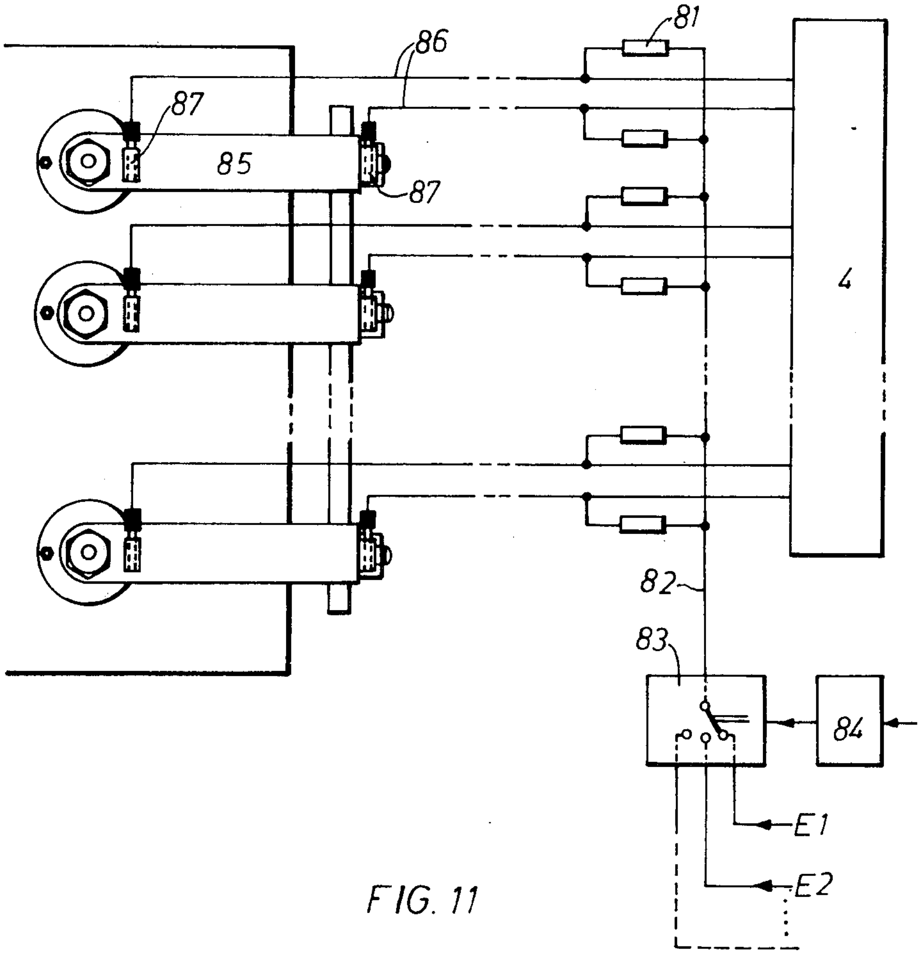
FIG. 11 is a plan view of one end of a multiplicity of cells showing schematically how their anodes are electrically tied into the systems of the present invention.

In the second case, the large number of plug connections increases the probability of error because transfer resistances increasing uncontrollably through corrosion and reductions in the contact force etc. can occur in the plug connection (and even in other readily releasable forms of connection). Transfer resistances of this kind can be automatically detected by connecting all the inputs of the multiplexer 4 connected to the anodes (in FIG. 11) to the busbar 82 through resistances 81, and by connecting this busbar through an electronic reversing switch 83 to one of two or more different voltage potentials. The reversing switch can be actuated by the process computer through an addressable binary store 84, as previously explained with reference to the circuit elements 79 and 80 (cf. FIG. 10).

The anode-current feeder bars 85 and the connecting lines 86 to the check point reversing switch 4 are of such low resistance that, given a suitable value of the resistances 81 (for example 10 k Ω ) and a low contact resistance at the voltage taps 87, the interrogated measured values transmitted to the process computer undergo hardly any change, providing the busbar 82 is successively connected through the computer to various voltage potentials. With increasing contact resistance, however, the influence of the busbar potential also becomes increasingly greater because of the voltage dividing effect of the contact resistance and the resistance 81. Accordingly, it is possible, by virtue of the simple auxiliary apparatus described above, providing the process computer is suitably programmed, to test all the voltage taps for excessive transfer resistances, for example when the normal cyclic interrogation produces doubtful results, by reversing the voltage potential of the busbar 82 for the following measured-value interrogation cycle. By making simple logical decisions, the process computer can, if desired, also identify and report the faulty check point and even the faulty tap 87.

It will be appreciated that the instant specification and examples are set forth by way of illustration and not limitation, and that various modifications and changes may be made without departing from the spirit and scope of the present invention.

What is claimed is:

1. A process for the remote transmission and indication of measured values of a plurality of check point of an electrolysis cell, comprising (a) the steps of sequentially interrogating, at a sampling facility, the measured value of each of said check points by stepping a first electronic pulse counter through a multiplexer connected to the pulse counter, said pulse counter driven by a series of address pulses uniquely representative of each of said check points, (b) sequentially transmitting all of said measured values in the form of an analog current signal over a single two wire path to a separate monitoring facility, and by providing in the two wire path a direct current separating transformer, (c) sequentially distributing to a respective indicator each of said measured values received by said monitoring facility by stepping a second electronic pulse counter through a second multiplexer connected thereto, said second pulse counter driven by said series of address pulses, (d) and providing said series of address pulses of opposite polarity of the measured value siganl from a common pulse generating source at said monitoring means to said first counter over the same single two wire path, the monitoring facility and the sampling facitity each being connected to the signal wires by a signal routing unit discriminating between the operational states of address pulse transmission and measured value transmission by virtue of the polarity of the transmitted signal, said monitoring facility thereby alternately receiving data from said sampling facility and sending addressing data to said sampling facility over a maximum of two signal wires, irrespective of the number of check points on each cell monitored.

2. A process as claimed in claim 1, wherein at least one additional connection of the multiplexer in the sampling facility, beyond the number of check points present at the electrolysis cell, is provided for testing measured value taps; the addressing of said additional connection alternatively setting and erasing a binary store; the setting of said store applying a voltage to a comparative resistor network connected to the wires connecting the measured value taps and the multiplexer; the contact resistances of said measured value taps being tested by comparing the input values of the multiplexer during one sequential interrogation cycle during which said store is set and another sequential interrogation cycle during which said store is erased.

3. A process as claimed in claim 1, wherein transistors are used for separating and connecting the measuring-signal paths in the, multiplexer and wherein these transistors functioning as signal switches are controlled by the electronic pulse counter through an adequate number of connecting lines and through an electronic decoding circuit with binary signals such that different combinations of signals are associated with the individual counting positions of the electronic pulse counter, different switching positions of the multiplexer being associated with the individual signal combinations.

4. A process as claimed in claim 1, wherein the electronic counter is switched from one counting step to the next from the monitoring facility by control pulses and the multiplexer is further switched from one check point to the next, the counter and multiplexer being switched back into the starting position from the same place by a reset pulse distinguishable from the further-switching pulses.

5. A process as claimed in claim 4, wherein the reset pulse is of much longer duration than the further-switching pulse.

6. A process as claimed in claim 1, wherein the pulse counter is preset and, by an impulse series identifying the required check point which is converted at the electrolysis cell into a parallel signal combination by means of an electronic shift register, is adjusted from the monitoring facility to the counting position associated with said check point.

7. A process as claimed in claim 6, wherein at least one counting position is not associated with the check point coupled with the multiplexer and is associated wth switching functions which are initiated through electronic binary circuits with or without a storage facility, the control inputs of these binary circuits being connected through a decoding circuit which only transmits for the associated signal combination to the signal outputs of the electronic pulse counter which characterize the counting position.

8. A process as claimed in claim 1, wherein the electronic pulse counter is either switched further from one counting position to the other by individual pulses or can be adjusted to certain counting positions by pulse series, for which purpose the electrolysis cell is provided with an electronic circuit which identifies the pulse signals received as individual pulses or a pulse series and, in the case of individual pulses, delivers them to the counting input and, in the case of a pulse series, delivers them to the set inputs of the pulse counter provided for presetting.

9. A process as claimed in claim 1, wherein the analog measuring signal available at the output of the multiplexer is amplified at the electrolysis cell to an energy level suitable for transmission to the monitoring facility, and is delivered through a twin-wire line to a separate instrument which electrically separates that part of the transmission line connected with the electrical voltage potential of the electrolysis cell from the part of the transmission line connected to ground and leading to the monitoring facility, a direct-current separating transformer being used for the potential-separating transmission of the analog measured-value signal.

10. A process as claimed in claim 1, wherein the measured-data signals transmitted from the electrolysis cell are only delivered to one indicating instrument in the monitoring facility or, through an electronic measured-value distributor which is reversed synchronously with the multiplexer of the electrolysis cell, is distributed to several indicating instruments or to one indicating instrument suitable for simultaneously displaying several measured values, the reading being maintained by means of electronic measured-value stores until the following measured-value signal arrives.

11. A process as claimed in claim 1, wherein a luminuous panel equipped with light-emitting diodes in horizontal and vertical lines is used as the indicating instrument for corresponding check points of different cells, the individual columns of the said light-emitting diode arrangement being associated with respective check points, the individual rows of the luminescence diodes being associated with the measured-value amplitude.

12. A process as claimed in claim 1, wherein it is the ratio of the measured value to a suitable reference value or the percentage deviation between the aforementioned measured-values which is indicated, the reference value either being taken from a check point present in the installation or being calculated in the same way as the derived indicated values by means of electronic analog or digital computer function elements which are provided in the monitoring facility, or by means of a digital process computer.

13. A process as claimed in claim 1, wherein the monitoring facility includes an electronic control loop which produces at least one of the types of pulse signal suitable for further switching, resetting or presetting the electronic pulse counter on the electrolysis cell, the function of which is initiated either by hand or by an automatic system.

14. A process as claimed in claim 1, wherein any lack of synchronization detected during sequential interrogation of check points is eliminated at regular time intervals by resetting or presetting the electronic pulse counter controlling check point selection and measured-value distribution.

15. A process as claimed in claim 1, wherein a plurality of electrolysis cells each being provided with a plurality of checkpoints, each cell having an associated sampling facility, multiplexer, pulse routing unit and potential separation connected through one monitoring facility, and a multiplexing system selectively connecting the measured-value reading and the checkpoint control to the various electrolysis cells.

16. A process as claimed in claim 1, wherein a constant voltage source is provided for remotely or automatically controlling the function of that part of the system connected to the electrolysis cell, and the multiplexer has additional connections for at least one other check point beyond the number of check points present on the cell, these additional connections being connected to the constant voltage source so that the voltage of the constant voltage source or known components of the voltage obtained by means of a voltage divider are interrogated in addition to the measured-values at the electrolysis cell and are compared for deviation from the values when the cells are operating properly.

17. Apparatus for the remote transmission and indication of measured values, in the form of an analog current signal, of a plurality of sampled electrolysis cell sources comprising a sampling system located in the area of said sources, a monitoring system located in a control area, and an isolator electrically isolating said sampling system from said monitoring system, said sampling system and said monitoring system being connected to each other through said isolator along a single electrical transmitting path, said path comprising no more than a single pair of electrical lines, said sampling system including sampling cycling means for cyclically and periodically sampling said sources and transmitting means coupling said sampling cycling means to said transmitting path for transmitting said sampled data to said monitoring system along said transmitting path, and said monitoring means including monitor cycling means for receiving and monitoring sampled data representative of each of said sources, and means providing addressing signals along said transmitting path for synchronizing said sampling cycle means with said cycling means whereby said sampled data received at said monitoring system is correlated with a source sampled at said sampling system, said monitoring system and said samping system each connected to said two wire path by a signal routing unit discriminating between sampled data and addressing signals.

18. The apparatus of claim 17, wherein said monitoring system includes a pulse generator, a counter and a multiplexer, said counter driven by said pulse generator for providing selection pulses to said multiplexer, said multiplexer coupled to said data line for receiving said sampled source data and channeling said sampled data in accordance with a counter state to an appropriate indicated uniquely representative of a respective one of said sources.

19. The apparatus of claim 18, wherein said sampling system includes a sampling counter and a sampling multiplexer, said sampling counter being driven by said monitoring system pulse generator over said address lines, and said synchronizing means including logic means coupled to said pulse generator and to both said counters for synchronizing said counteres whereby each respective indicator is uniquely representative of a respective one of said sources.

* * * * *

UNITED STATES PATENT AND TRADEMARK OFFICE

CERTIFICATE OF CORRECTION

PATENT NO. : 4,035,771

DATED : July 12, 1977

INVENTOR(S) : Walter Büsing et al

It is certified that error appears in the above-identified patent and that said Letters Patent are hereby corrected as shown below:

Col. 5, line 38, cancel "to" and substitute -- at --.
Col. 6, line 32, cancel "by" and substitute -- to --.
Col. 6, line 45, after "double" insert -- pole --.

Col. 15, line 35, claim 11, cancel "luminescence" and substitute -- said light-emitting --.
Col. 16, line 39, claim 17, after "said" 2nd. occ. insert -monitor-
Col. 16, line 53, claim 18, change "indicated" to --indicator--.
Col. 16, line 61, claim 19, change "counteres" to --counters--.

Signed and Sealed this

*Twenty-third* Day of *May 1978*

[SEAL]

*Attest:*

RUTH C. MASON
*Attesting Officer*

LUTRELLE F. PARKER
*Acting Commissioner of Patents and Trademarks*